(12) United States Patent
Poroseva et al.

(10) Patent No.: US 7,652,396 B2
(45) Date of Patent: Jan. 26, 2010

(54) SYSTEMS AND METHODS FOR IMPROVING THE ABILITY OF A POWER DELIVERY SYSTEM TO WITHSTAND MULTIPLE FAILURE EVENTS

(75) Inventors: Svetlana V. Poroseva, Tallahassee, FL (US); Mohammed Yousuff Hussaini, Tallahassee, FL (US); Stephen L. Woodruff, Tehachapi, CA (US)

(73) Assignee: Florida State University Research Foundation, Tallahassee, FL (US)

(*) Notice: Subject to any disclaimer, the term of this patent is extended or adjusted under 35 U.S.C. 154(b) by 378 days.

(21) Appl. No.: 11/781,798

(22) Filed: Jul. 23, 2007

(65) Prior Publication Data
US 2008/0030079 A1 Feb. 7, 2008

Related U.S. Application Data

(60) Provisional application No. 60/820,075, filed on Jul. 21, 2006.

(51) Int. Cl.
*H01B 7/00* (2006.01)
(52) U.S. Cl. .......................................... 307/147; 307/43
(58) Field of Classification Search .................. 307/43, 307/147
See application file for complete search history.

(56) References Cited

OTHER PUBLICATIONS

Amy Jr., Jul. 2002, "Consideration in the Design of Naval Electric Power Systems," in Proc. IEEE 2002 Power Eng. Soc. Summer Meeting (Chicago, IL), vol. 1, pp. 325-330, 5 pages.

Butler et al., 2001, "Network Reconfiguration for Service Restoration in Shipboard Power Distribution Systems," IEEE Transactions On Power Systems, 16(4):653-661.

Butler-Purry et al., 2004, "Self-Healing Reconfiguration for Restoration of Naval Shipboard Power Systems," IEEE, 9 pages.

Curcic et al., 1996, "Electric Power Distribution Network Restoration: A Survey of Papers and a Review of the Restoration Problem," Electric Power Systems Research, 35:73-86.

Doerry, Sep. 23, 2004, "Zonal Ship Design," Reconfiguration & Survivability Symposium held in Atlantic Beach, Florida, 13 pages.

Ganesh et al., 2005, "Energy Management System with Automatic Reconfiguration for Electric Shipboard Power Systems," Reconfiguration & Survivability Symposium held in Atlantic Beach, Florida, 10 pages.

(Continued)

*Primary Examiner*—Robert L. DeBeradinis
(74) *Attorney, Agent, or Firm*—Sutherland Asbill & Brennan LLP

(57) ABSTRACT

The invention is directed to systems and methods for enhancing the ability of a power delivery system to withstand the occurrence of multiple failure events. Specifically, the invention is directed to a power delivery system employing a web-type network topology for a generator bus where at least two power generating sources, such as generators, are connected by an external ring, wherein the external ring is comprised of a plurality of ring segments. A first set of cables connects each power generating element with a central point and a second set of cables connects the center of each ring segment with the central point, wherein power is deliverable to the central point via at least one of the external ring, first set of cables and the second set of cables. Additional internal rings of cables may also be utilized to connect the first and second sets of cables.

20 Claims, 4 Drawing Sheets

OTHER PUBLICATIONS

Glaeser et al., Feb. 2005, "Specifying and Assessing Survivability in Early Stage Ship Design," Reconfiguration & Survivability Symposium held in Atlantic Beach, Florida, 8 pages.

Gong et al., Feb. 2005, "Integrated Protection and Reconfiguration Design for the All-Electric Ship," Reconfiguration & Survivability Symposium held in Atlantic Beach, Florida, 7 pages.

Hill, Feb. 2005, "Design Features for Survivability of High Speed Ships," Reconfiguration & Survivability Symposium held in Atlantic Beach, Florida, 33 pages.

Hill, Feb. 2005, "Survivable Architectures for Vital Systems," Reconfiguration & Survivability Symposium held in Atlantic Beach, Florida, 38 pages.

Khushalani et al., Feb. 2005, "Optimized Restoration of Shipboard Power Systems with IPS Architecture and Distributed Generation," Proceedings of the American Society of Naval Engineers Reconfiguration and Survivability Symposium 2005, Atlantic Beach, Florida, 20 pages.

Maturana et al., Feb. 2005, "An Interoperable Agent-Based Control System for Survivable Shipboard Automation," Reconfiguration & Survivability Symposium held in Atlantic Beach, Florida, 11 pages.

Novak et al., May 2001, "Advanced Shipboard Control Systems," 88 pages.

Oliveto, 1998, "System Efficiency/Merit (A Total System Evaluation)," IEEE, pp. 51-59.

Poroseva et al., Nov. 13-14, 2006 (presented at Proc. Ships & Ship Systems Technology Symposium), "Application of Web-Topology to Enhance Survivability of the Integrated Power System in an All-Electric Warship," 15 pages.

Poroseva et al., (presented at the Proceedings of the ASNE Day Jun. 19-21, 2006), "Enhancing Survivability of All-Electric Warships through Implementation of Effective Topologies into the Integrated Power System," 16 pages.

Poroseva et al., 2006, "Survivability of the Generator Bus in an All-electric Ship under Multiple Faults," submitted to IEEE Trans. on Power Systems, 8 pages.

Poroseva et al., Jul. 25-27, 2005, "Topology of the Generator Bus in a Warship Integrated Power System," Proc. IEEE Electric Ship Technologies Symposium, Philadelphia, Pennsylvania, 9 pages.

Sajdak et al., Jun. 2006, "Four Levels of Ship Survivability," Proc. ASNE Day 2006, (Arlington, VA), 14 pages.

Woodruff, Feb. 2005, "Simulation Evaluation of Reconfiguration Strategies," Reconfiguration & Survivability Symposium held in Atlantic Beach, Florida, 8 pages.

SYSTEMS AND METHODS FOR IMPROVING THE ABILITY OF A POWER DELIVERY SYSTEM TO WITHSTAND MULTIPLE FAILURE EVENTS

CROSS-REFERENCE TO RELATED APPLICATION

This application claims the benefit of priority to U.S. Provisional Patent Application Ser. No. 60/820,075 entitled, "Web-Type Network Topology of Enhanced Resistance to Multiple Damage," which was filed in the United States Patent and Trademark Office on Jul. 21, 2006, the specification and appendices of which are hereby incorporated by reference.

STATEMENT OF GOVERNMENT INTEREST

The work that led to this invention has been supported in part by a grant from the Office of Naval Research through grant number N00014-02-1-0623. Thus, the United States Government may have certain rights to this invention.

FIELD OF THE INVENTION

This invention relates to powers delivery systems. More specifically, the invention relates to the configuration and evaluation of a power delivery system's network topology to increase the power delivery system's resistance to multiple failures.

BACKGROUND OF THE INVENTION

In most power delivery systems it is important that the system be robust enough to ensure uninterrupted service despite failure events that occur in a portion of the power delivery system. For example, in naval platforms, such as a warship, the survivability of a system often depends on the ability of the integrated power system (IPS)—used to distribute power to various systems throughout the ship including control, propulsion, and combat systems, as well as ship service loads—to withstand the occurrence of multiple failures (or faults).

Survivability is the ability to provide power for consumers/loads under multiple faults caused by natural or hostile disruptions. Failure of a single IPS level, such as the generator bus, to supply power to the rest of the IPS will immediately result in failure of the entire IPS. Power interruption, let alone total power loss, would most certainly lead to mission failure, possibly complete destruction of the ship, as well as personnel and economic losses.

Failure events or "faults" include the loss of a cable or generator. Faults can be caused by direct hits or as a result of secondary or cascading damage. Each fault is considered an event that may not be repaired during battle. Thus, multiple faults are viewed as independent events and considered to be simultaneously occurring in that each fault persists until repair is possible and achieved. If after the faults have occurred, the generator bus is still able to supply power produced by all generators to the rest of the IPS and no response is required, then the generator bus is said to survive the given number of faults without requiring IPS reconfiguration. If power supplied from the generator bus to the rest of the IPS is reduced either due to damage of at least one generator or due to faults in cables isolating at least one generator, then the generator bus is said to survive requiring IPS reconfiguration.

Up to now, increases in IPS survivability have mostly been achieved through generator redundancy. However, in the design of a ship (or other vehicle) or a power distribution system, cost, weight, and spatial separation of generators limit this option. Reconfiguration is commonly viewed as a tool for ensuring uninterrupted power supply to ship loads. However, the act of reconfiguration itself entails a cost and delay. For instance, reconfiguration activities may interfere with activities of other ship systems, because they require ship control and communication resources to analyze faults, reroute paths, and perform switch-over operations. Electrical transients induced by switch-overs may hinder operations or even damage equipment. Further, the survivability of a power delivery system cannot exceed that determined by the topological limitations of the system. Therefore, the power delivery system's survivability is limited by the topological constraints of the system.

SUMMARY OF THE INVENTION

The invention is directed to systems and methods for enhancing the survivability—the ability of a power delivery system to withstand multiple failures—of a power delivery system. Embodiments of the invention involve the design of an IPS architecture with increased resistance to multiple faults built directly into the architecture. By building increased resistance to multiple faults directly into the IPS architecture, one can enhance the IPS survivability, delay reconfiguration activities and improve reconfiguration efficiency.

Example embodiments of the invention are directed to a web-type configuration of a power delivery system's generator bus, such as an IPS generator bus, to increase the survivability of the power delivery system functionality during unpredictable multiple failure events. Such systems may include the electric power system of a naval warship where the multiple failure events are caused by damage sustained by the warship during battle.

The web-type topology increases the probability for the power delivery system to survive without requiring IPS reconfiguration and decreases the probability of complete failure. Further, implementation of a web topology in a power delivery system reduces the need for redundancy of key elements without jeopardizing network survivability, thereby saving additional expense and avoiding equipment weight and volume concerns associated with the redundancy of key elements. Additionally, web topology allows for sufficient spatial separation of topological elements (e.g., generators, transformers, network equipment, etc.), such that failure events affect as few topological elements as possible on each failure event occurrence.

The systems and methods described herein may also be applied to any power delivery system susceptible to failure events. Various embodiments of the invention as well as addition features are discussed in more detail below.

BRIEF DESCRIPTION OF THE FIGURES

Figure 1:
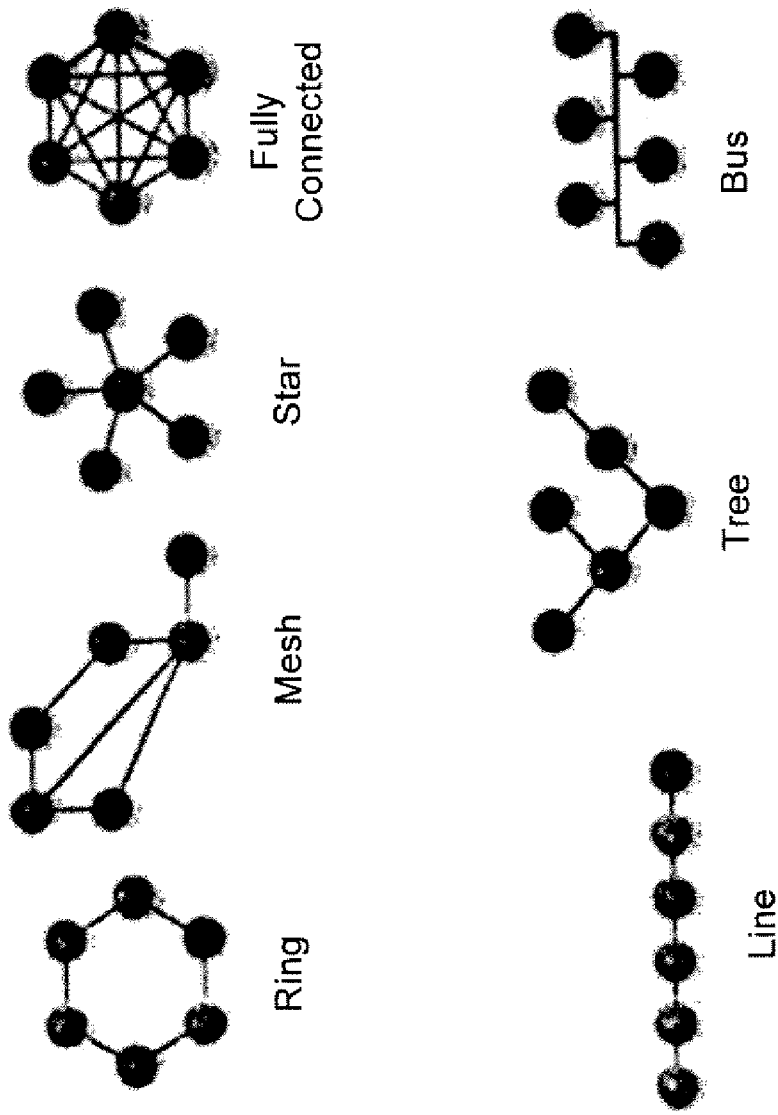

Having thus described the invention in general terms, reference will now be made to the accompanying drawings, which are not necessarily drawn to scale, and wherein:

FIG. 1 shows prior art topology configurations used to connect the key elements in networks.

Figures 2A, 2B:
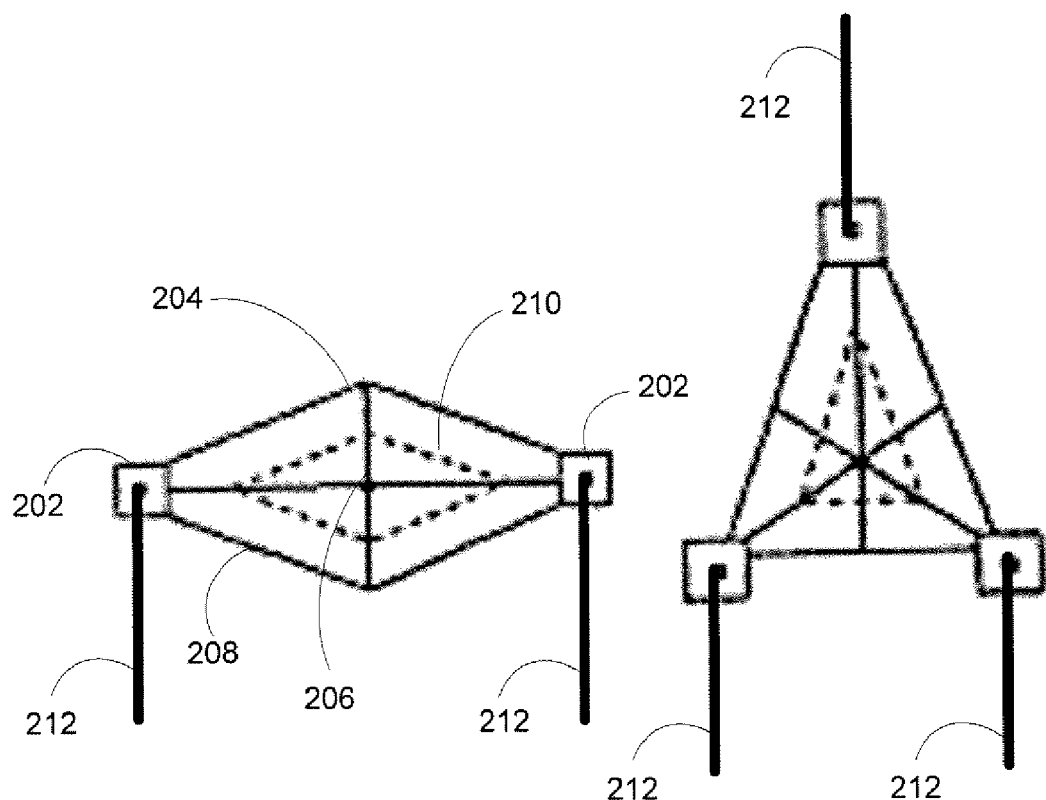

FIG. 2A shows a web topology applied to a power delivery system with two key elements in accordance with an example embodiment of the invention.

FIG. 2B shows a web topology applied to a power delivery system with three key elements in accordance with an example embodiment of the invention.

Figure 2C:
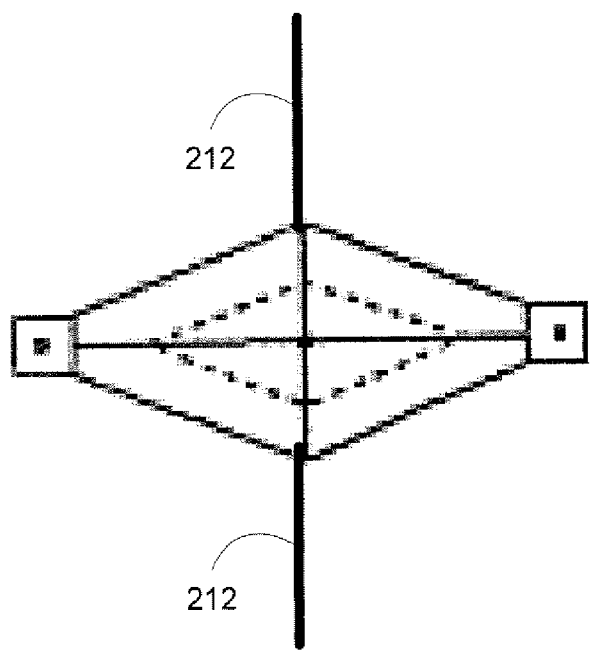

FIG. 2C shows a web topology applied to a power delivery system where the cables from the generator bus to the rest of the IPS have been repositioned in accordance with an example embodiment of the invention.

Figure 3:
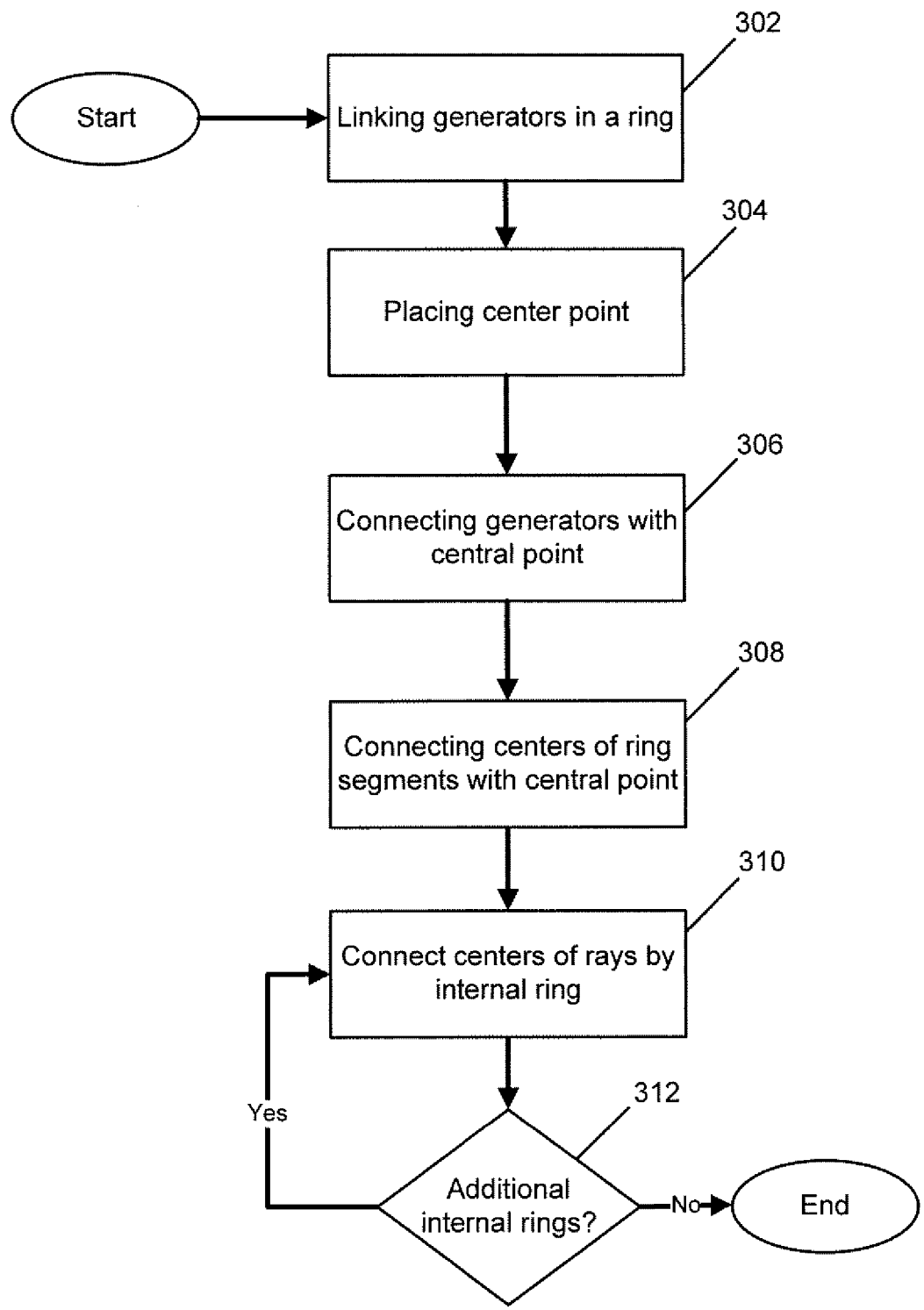

FIG. 3 shows a flowchart of method for designing a power system with a web topology in accordance with an example embodiment of the invention.

Figure 4:
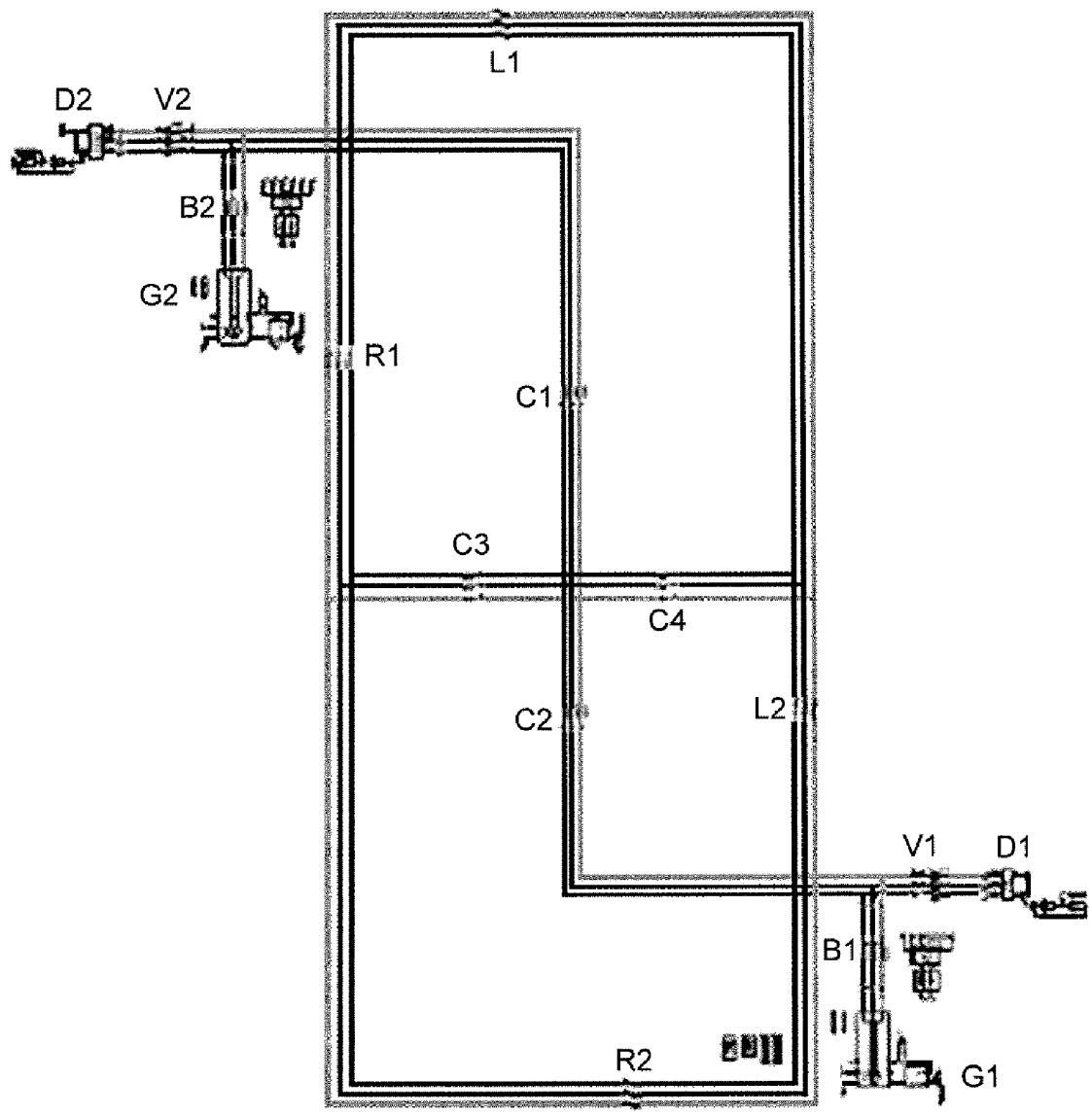

FIG. 4 shows a generator bus in a ship power system to supply power in various failure event scenarios utilizing web-type topology in accordance with an example embodiment of the invention.

DETAILED DESCRIPTION OF THE INVENTION

The invention is directed to systems and methods for a power delivery system to withstand multiple failure events. The invention aids in the construction, configuration and evaluation of various networks, such as power delivery networks, communication networks, etc., whose function depends critically on the non-interrupted service of few key elements, and which are potential subject to multiple damage resulting from natural disasters or human action or unintentional failures in control systems may utilize the invention. Some examples of such systems include power systems with more than one power generator (power systems in electrical vehicles, ships, aircraft, spacecraft, electric utility distribution systems and the like); wired computer/communication systems in financial institutes, commercial companies, etc.

The invention may be applied to new distributed systems, or enhance the "survivability" of those already in use. The survivability of a distributed system describes a system's ability to withstand multiple failures to maintain service throughout the network without interruption. When designing new networks, the web configuration of an example embodiment of the invention described below may allow for decreased redundancies in a network's key-elements without jeopardizing the network survivability. Since key network elements contribute significantly in the cost associated with building and maintaining such a network, limiting unnecessary redundancies without compromising a systems survivability is desirable. Further, in a specific application, such as a warship, the weight associated with redundant key network elements such as generators is also a factor considered in the system's design. The web topology of an example embodiment of the invention may alleviate equipment weight and volume concerns by eliminating unnecessary redundancies.

Example embodiments of the invention now will be described more fully hereinafter with reference to the accompanying drawings, in which example embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Example embodiments of the invention are described below with reference to block diagrams and flowchart illustrations of systems, methods, apparatuses and computer program products according to an embodiment of the invention. It will be understood that each block of the block diagrams and flowchart illustrations, and combinations of blocks in the block diagrams and flowchart illustrations, respectively, can be controlled or implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Example embodiments of the invention will hereinafter be described with reference to the figures, in which like numerals indicate like elements throughout the several drawings.

Topologies already being utilized to connect key elements in power and/or communication networks are shown in FIG. 1. As shown in FIG. 1, these topologies include ring, mesh, star, fully connected, line (or radial), tree and bus topologies. The ring topology is typically employed in ship electrical systems and other power delivery systems, while the mesh and star topologies is often employed in communication networks. Although each of these topologies has its own set of advantages and disadvantages, as will be discussed below, the web configuration of an example embodiment of the invention has additional features not included in any of these prior art topologies shown in FIG. 1. Further, the combination of advantageous features associated with the web configuration of an example embodiment of the invention is unlike any of the prior art topologies.

FIGS. 2A-2C shows various embodiments of the web topology configuration for connecting the key elements of a network, thereby enhancing the probability of non-interrupted service by the key elements to the rest of the network. FIG. 2A shows a web topology applied to a power delivery system with two key elements in accordance with an example embodiment of the invention, while FIG. 2B shows a web topology applied to a power delivery system with three key elements in accordance with an example embodiment of the invention. The example web topologies shown in FIGS. 2A and 2B include key elements 202, such as power generating elements in a power delivery system. In various network configurations, key elements 202 may include generators, transformers and/or other network equipment connected to the rest of the system through the web. While FIGS. 2A and 2B show web-type configurations with two or three key elements 202, alternative embodiments may include more key elements 202.

Also shown in the web topologies of FIGS. 2A and 2B, is an external ring 204 connecting the key elements 202 between themselves. Generators belong to a separate IPS layer if they are connected to each other independently from other elements of the IPS. A link between two generators is called a horizontal link. Generally, two generators can be linked by several independent cables or by a partitioned cable. A central (or center) point 206 location is selected, and the central point 206 is connected via crossing links or rays (e.g., cables)—to each key element 202. In an alternative embodiment of the invention, a key element 202, such as a generator may be located at the central point 206.

Additional horizontal links (or cables, where one link corresponds to one cable) connect the central point 206 with external ring segments 208. The ring segments 208 may be broken up into smaller segments. A point of cable interconnection is referred to as a node. Key elements 202, such as generators, and the central point 206 may also be considered nodes. The cable between two nodes may also be referred to as an edge. A path connecting any two generators in a web is called a link. A link may consist of several edges, and a link length may be described in the number of edges in the link. There are eight total horizontal links shown in solid lines in FIG. 2A (12 total if the dotted-lined internal ring 210 is counted). There are 12 total horizontal links shown in solid lines in FIG. 2B (16 total if the dotted-lined internal ring 210 is counted).

Topologies with higher interconnectivity of horizontal links have higher survivability characteristics. Moreover, the more horizontal links, the easier it is to maintain spatial separation of key elements, which is an important consideration depending on the expected size of the failure event. For example, if an explosion would be the expected failure event and if the key elements are spaced far enough apart, then one failure event is less likely to eliminate two key elements at once. Further, partitioning horizontal links and repositioning vertical links (discussed below with reference to FIG. 2C) further increase survivability of the power system generator bus configuration, In the example embodiments of FIGS. 2A and 2B, an internal ring 210 is shown with dotted lines. The internal ring of cables 210 interconnects the horizontal links running from the central point 206 to other elements of the web topology. In alternative embodiments of the invention, the horizontal links may be increased and the web topology may be enhanced by including two or more internal rings of cables 210.

As shown in FIGS. 2A and 2B vertical links 212 (or external links) are connected directly to each key element 202. The generator bus is connected with the rest of the IPS by vertical links. Vertical links 212 may be attached to generators or to horizontal links, central points, etc. Although vertical links are not part of generator bus topologies, their losses directly affect the survivability of the generator bus. Vertical links 212 may be a non-partitioned cable from a generator to the rest of the IPS. In alternative embodiments, vertical links may vary in number, structure and the way they connect to the generator bus. Although not shown in FIGS. 2A-2C vertical links 212 may connect one layer of the IPS employing web topology configuration, with another layer employing web topology configuration, essentially linking the two webs. Further, the vertical links 212 may also be configured in a web topology, created webs nested within webs in increase the survivability of the power delivery system.

FIG. 2C shows a web topology applied to a power delivery system where the vertical links 212 have been repositioned in accordance with an example embodiment of the invention. As shown in FIG. 2C, the vertical links 212 have been repositioned to be connected to a node where the external ring 204 is connected to the central point 206 through a horizontal link. By repositioning the vertical links 212 from the key elements to nodes in horizontal links, the probability of complete power delivery failure is decreased. Thus, the repositioning of the vertical links 212 improves the web performance without changing the topology.

A generator bus topology may be characterized by the number of generators (g), the number of horizontal (h) and vertical (v) links, and the manner in which the generators are connected to each other. The total number of elements M in a topology is M=g+h+v.

In one exemplary embodiment of the invention, all horizontal links in the generator bus are activated prior to battle in order to delay the need for reconfiguration. Faults of principle concern are the loss of a cable or a generator. Faults can be caused by direct hits or as a result of secondary or cascading damage. Each fault is considered as an event that has already happened and may not be repaired during battle. In this sense, multiple faults are viewed as independent events that each persist while additional failure events may occur. Each possible combination of m damaged elements from the total number of elements M is defined as a fault scenario. The total number of scenarios, N, can be determined as $$N = \frac{M!}{m!(M-m)!},$$

where $k! = 1 \cdot 2 \cdot \ldots \cdot k$ is the factorial.

Faults in the generator bus and in the vertical links provoke three types of response from the rest of the IPS: (1) no response; (2) reconfiguration (in the rest of the IPS) due to the change in the amount of available power; and (3) IPS failure due to complete interruption of the power supply.

In "no response" scenarios, no generator is damaged, and faults in horizontal and vertical links do not isolate any of generators. That is, after the faults, the generator bus is still able to supply power produced by all generators to the rest of the IPS and no response is required. In such a case, the topology survives a given number of faults without requiring IPS reconfiguration. The number of "no response" scenarios is denoted by S.

Scenarios in which power supplied from the generator bus to the rest of the IPS is reduced either due to damage of at least one generator or due to faults in vertical and horizontal links isolating at least one generator require IPS reconfiguration. Such scenarios are called reconfiguration scenarios. The number of reconfiguration scenarios is denoted by R.

Scenarios in which all generators are damaged, or with faults in all vertical links, or with faults in generators, horizontal, and vertical links which lead to a complete interruption in power supply, are called scenarios of complete failure. Their number is denoted by F.

At a given value of m, the total number of fault scenarios leading to each IPS response can be used to determine the response probability P, under the assumption that each scenario is equally likely. Those of ordinary skill in the art will appreciate that the calculation may be adjusted by varying the likelihood of each scenario occurring. The probability P is defined as the ratio of the number of fault scenarios resulting in an IPS response to the total number of fault scenarios N. Then, $$P(S)=S/N,\ P(R)=R/N,\ P(F)=F/N,$$

where P(S) is the survival probability without IPS reconfiguration, P(R) is the survival probability with IPS reconfiguration, and P(F) is the probability of complete IPS failure. Since N=S+F+R, at any value of m, the probabilities of the three responses sum to unity:

$$P(S)+P(R)+P(F)=1.$$

The performance of a topology at a given number of faults may be characterized by these three probabilities under the assumption that all scenarios are equally probable at a given value of m. More factors may also be considered when determining the probabilities of IPS responses such as varying the probability of occurrence of each scenario, which in turn depends on the probability of damage for links and generators included in the scenario (i.e., susceptibility).

A simple way to compare different topologies is to contrast probabilities of different IPS responses at a given value of m, but cumulative criteria reflecting topology performance over several values of m are a better choice. Three cumulative criteria are:

$$C_X(S) = \frac{\sum_{m=1}^{X} P(S)}{X},\ C_X(R) = \frac{\sum_{m=1}^{X} P(R)}{X},$$

$$C_X(F) = \frac{\sum_{m=1}^{X} P(F)}{X}.$$

X denotes the upper limit of faults for which the C-values are evaluated. The value of X should be chosen based on the estimated number of failure events (e.g., hits in an attack, the number of hits a ship can survive without sinking, etc).

In an exemplary embodiment of the invention, the number of vertical links 212 should be equal to or larger than the number of generators. Further, additional vertical links 212 in the generator bus are more effective than additional horizontal links for increasing survivability of the system. The more horizontal links included in the topology the higher the ratio between the number of scenarios to recover without requiring reconfiguration in the rest of the IPS and the number of reconfiguration scenarios. The desirable features of a topology for the generator bus in the integrated power system of a warship are high survival probability under multiple failure events without requiring IPS reconfiguration and a low probability of complete failure. Further, when the limits on generators and vertical links 212 are exhausted, horizontal links may be used to enhance the generator bus survivability.

Partitioning and re-positioning links may achieve higher survivability characteristics without the cost and weight of additional generators. In the web topology of the example embodiment of the invention, the increase in the number of horizontal links is combined with their partitioning. Moreover, increasing the number of vertical links 212 and choosing their optimum positions can further enhance the recoverability of the web topology.

FIG. 3 shows a flowchart of method for designing a power system with a web topology in accordance with an example embodiment of the invention. Web topology may also be integrated into already existing designs. The larger number of cables gives more freedom in placing them (e.g., redundant cables on opposite sides of the ship, cables in safer rather than less safe area of the ship, etc.).

As shown in FIG. 3, the construction of a web topology for a power delivery system begins at step 302, where the generators are first linked in a ring configuration, where each link is considered a ring segment. Step 304 is then invoked where the placement of the central point is determined. In an example embodiment of the invention, the central point should be located a safe place. The susceptibility of different parts of the system to damage should be taken into account during configuration design. The expected damage and a ship's geometry should also be taken into consideration during configuration design. Other factors appreciable by one of ordinary skill in the art may also be considered during configuration design. While FIGS. 2A-2C discussed above and FIG. 4 discussed below show the central point to be in the center of the configuration, in alternative embodiments of the invention the central point may be located elsewhere in the configuration (i.e., not necessary centrally located).

Next, the generators are each connected with the central point in step 306. In an alternative embodiment of the invention, a key element 202, such as a generator may be located at the central point 206. Step 308 is then invoked where the center of each ring segment is connected with the central point. Next, the center of each ray is connected by an internal ring in step 310. In alternative embodiments of the invention step 310 does not have to be performed, and the process may end at step 308.

In step 312 it is determined if any additional internal rings are desired for the power system configuration. If addition internal rings are desired, step 310 is repeated where new ray segments created by the intersection of the first internal ring are themselves intersected by another internal ring. If it is determined in step 312 that no additional internal rings are desired the process ends.

FIG. 4 shows a generator bus in a ship power system to supply power in various failure event scenarios utilizing web-type topology in accordance with an example embodiment of the invention. The generator bus shown in FIG. 4, includes generators, G1 and G2. In an exemplary embodiment of the invention, the generator may be a synchronous machine with the rated MVA equal to 45. Ship loads D1 and D2 may be represented by two dynamic loads (RL type) of 18 MW each. Vertical links V1 and V2 connect the generators with the loads D1 and D2, respectively. Horizontal links, L1, L2, R1, R2, C1-C4, connect the generators G1 and G2 with each other, creating the web topology for the generator bus. In the exemplary embodiment of the invention, the links are three-phase cables. Although vertical links V1 and V2 are not part of a generator bus topology, their losses are directly related to losses of horizontal links.

In the exemplary embodiment of FIG. 4, breakers B1 and B2 are installed in the link connecting the generator with other topological elements. A potential fault in a horizontal or vertical link is represented by a three-phase breaker in each link (shown by black lines next to the name of the link and on top of the cable or the B1 and B2 breakers in the vertical link). An open breaker simulates damage in the corresponding link.

In the configuration and simulation of FIG. 4, prior to fault conditions occurring (i.e., prior to battle) a steady solution is achieved where all horizontal links in the generator bus are activated prior to battle (i.e., the breakers are closed). Multiple faults are then introduced into the system simulated by opening various breakers which open a connecting cable or disconnect a generator from the rest of the system. In spite of the fault disruptions, the power to the loads (the current in at least one of the vertical links) is maintained as long as at least one link from either G1 or G2 to the load remained intact. Even with different sets of faults in the horizontal links where both generators and vertical links are operational, both generators continue to supply power to the loads in an unchanged amount. Thus, faults in the horizontal links do not affect power flow, and the parameters of the generator such as voltage (Vrmspu), frequency (Rad/Sec), real output power POUT (MW), reactive output power QOUT (MVAR), output voltage (kV) for each phase, and output current (kA) for each phase remain unchanged. Further, in the configuration and simulation of FIG. 4, when a fault occurs in a vertical link V1 and one of the generators is damaged—regardless of the horizontal links functioning normally or if some of the horizontal links are damaged—the power output from the other generator remains unchanged. However, when a fault occurs in a vertical link V1 and both of the generators G1 and G2 are functioning properly both generators then adjust in response to the vertical link damage in that both generators each supply half has much power to the same load regardless of the horizontal links functioning normally or if some of the horizontal links are damaged.

Accordingly, many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of this application. Although specific terms are employed herein, they are used in a generic and descriptive sense only and not for purposes of limitation.

That which is claimed:

1. A power delivery system comprising:
   at least two power generating elements;
   an external ring connecting the at least two power generating elements, wherein the external ring is comprised of a plurality of ring segments;
   a first set of cables connecting each power generating element with a central point; and
   a second set of cables connecting a center of each ring segment with the central point, wherein power is deliverable to the central point via at least one of the external ring, first set of cables or the second set of cables.

2. The system of claim 1, further comprising at least one internal ring of at least a third set of cables interconnecting the cables running from the central point to the at least two power generating elements, the first set of cables and the second set of cables.

3. The system of claim 2, further comprising a vertical link connected to a node, wherein the node is an interconnection between at least two of the ring segments, the first set of cables, the second set of cables, and the at least one internal ring.

4. The system of claim 1, wherein the at least two power generating elements are generators.

5. The system of claim 1, wherein the at least two power generating elements are each connected to a vertical link.

6. The system of claim 5, further comprising at least one internal ring of at least a third set of cables interconnecting the cables running from the central point to the at least two power generating elements, the first set of cables and the second set of cables.

7. The system of claim 1, wherein the central point is connected to a vertical link.

8. The system of claim 7, further comprising at least one internal ring of at least a third set of cables interconnecting the cables running from the central point to the at least two power generating elements, the first set of cables and the second set of cables.

9. The system of claim 1, wherein the central point includes a generator.

10. The system of claim 1, wherein the central point is further connected to a load.

11. A method for providing a power delivery system comprising:
    providing at least two power generating elements;
    connecting the at least two power generating elements via an external ring, wherein the external ring is comprised of a plurality of ring segments;
    connecting a first set of cables between each power generating element and a central point; and
    connecting a second set of cables between a center of each ring segment and the central point, wherein power is deliverable to the central point via at least one of the external ring, first set of cables or the second set of cables.

12. The method of claim 11, further comprising interconnecting the cables running from the central point to the at least two power generating elements, the first set of cables and the second set of cables with at least one internal ring of at least a third set of cables.

13. The method of claim 12, further comprising connecting a vertical link to a node, wherein the node is an interconnection between at least two of the ring segments, the first set of cables, the second set of cables, and the at least one internal ring.

14. The method of claim 11, wherein providing at least two power generating elements includes providing at least two generators.

15. The method of claim 11, further comprising connecting the at least two power generating elements to a vertical link.

16. The method of claim 15, further comprising interconnecting the cables running from the central point to the at least two power generating elements, the first set of cables and the second set of cables with at least one internal ring of at least a third set of cables.

17. The method of claim 11, further comprising connecting the central point to a vertical link.

18. The method of claim 17, further comprising interconnecting the cables running from the central point to the at least two power generating elements, the first set of cables and the second set of cables with at least one internal ring of at least a third set of cables.

19. The method of claim 11, wherein connecting a first set of cables between each power generating element and a central point includes connecting a first set of cables between each power generating element and a load.

20. The method of claim 11, further comprising selecting the location of the central point.

* * * * *